US008056126B2

(12) United States Patent
Otake et al.

(10) Patent No.: US 8,056,126 B2
(45) Date of Patent: Nov. 8, 2011

(54) AUTHENTICATION SYSTEM FOR INSTRUCTION PROCESSING APPARATUS, IMAGE FORMING APPARATUS, AUTHENTICATION CONTROL METHOD, AND AUTHENTICATION CONTROL PROGRAM

(75) Inventors: Toshihiko Otake, Nishinomiya (JP); Daisuke Sakiyama, Maizuru (JP); Takanobu Kuge, Itami (JP); Hideyuki Matsuda, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1142 days.

(21) Appl. No.: 11/019,400

(22) Filed: Dec. 23, 2004

(65) Prior Publication Data
US 2006/0064753 A1 Mar. 23, 2006

(30) Foreign Application Priority Data
Sep. 21, 2004 (JP) .................................. 2004-273891

(51) Int. Cl.
G06F 7/04 (2006.01)
(52) U.S. Cl. ........... 726/17; 726/2; 726/3; 726/4; 726/5; 726/6; 726/7; 726/8; 726/9; 726/10; 726/11; 726/12; 726/13; 726/14; 726/15; 726/16; 726/18; 726/19; 726/20; 726/21; 726/26; 726/27; 726/28; 726/29; 713/182; 358/1.14; 358/1.15
(58) Field of Classification Search ............... 726/2–21, 726/26–29
See application file for complete search history.

(56) References Cited

U.S. PATENT DOCUMENTS

| 5,936,543 | A | 8/1999 | Matsumoto | |
|---|---|---|---|---|
| 5,999,766 | A | * 12/1999 | Hisatomi et al. | 399/80 |
| 6,425,085 | B2 | 7/2002 | Hashikura | |
| 6,466,781 | B1 * | 10/2002 | Bromba et al. | 455/411 |
| 6,498,912 | B1 | 12/2002 | Leni et al. | |
| 6,535,297 | B1 | 3/2003 | Steele et al. | |
| 6,709,081 | B2 | 3/2004 | Ishinaga et al. | |
| 7,117,493 | B2 * | 10/2006 | Matsushima | 717/173 |
| 7,131,000 | B2 * | 10/2006 | Bradee | 713/164 |
| 7,171,379 | B2 * | 1/2007 | Menninger et al. | 705/28 |
| 7,200,754 | B2 * | 4/2007 | Walters | 713/182 |
| 7,436,552 | B2 * | 10/2008 | Nozato | 358/406 |
| 2003/0152231 | A1 | 8/2003 | Tomita et al. | |
| 2004/0177272 | A1 * | 9/2004 | Walters | 713/201 |
| 2005/0044248 | A1 * | 2/2005 | Mihira et al. | 709/229 |

(Continued)

FOREIGN PATENT DOCUMENTS
JP 2000-224161 8/2000
(Continued)

OTHER PUBLICATIONS

Takuya Honda et al. "Management System and Management device used therefor" translated by: The MCelroy Translation Company, Feb. 2008, pp. 1-22 (JP 2003-107966).*

(Continued)

Primary Examiner — Edan Orgad
Assistant Examiner — Canh Le
(74) Attorney, Agent, or Firm — Buchanan Ingersoll & Rooney PC

(57) ABSTRACT

An authentication system for an instruction processing apparatus includes first and second authentication portions each for performing user authentication at the time of using the instruction processing apparatus, and a controller which makes the first authentication portion execute the user authentication and switches from the first authentication portion to the second authentication portion when the user authentication by the first authentication portion cannot be established.

10 Claims, 12 Drawing Sheets

U.S. PATENT DOCUMENTS

2006/0056666 A1* 3/2006 Mizutani et al. .............. 382/118
2008/0093446 A1 4/2008 Tomita et al.

FOREIGN PATENT DOCUMENTS

| | | |
|---|---|---|
| JP | 2001-312380 | 11/2001 |
| JP | 2003-107966 | 4/2003 |
| JP | 2003-132029 A | 5/2003 |
| JP | 2003-167854 A | 6/2003 |
| JP | 2003-288323 A | 10/2003 |
| JP | 2003-323411 A | 11/2003 |

OTHER PUBLICATIONS

Japanese Notice of Ground of Rejection for JP Patent Application No. 2004-273891, dated May 30, 2006, and English translation.

Japanese Decision of Refusal for JP Patent Application No. 2004-273891, dated Jan. 23, 2007, and English translation.

Japanese Decision of Patent Grant dated Jul. 17, 2007 issued in corresponding Japanese Patent Application No. 2004-273891 and English language translation.

* cited by examiner

| User name | Department | Password | Internal password | E-mail address | Functional restrictions | | | | |
|---|---|---|---|---|---|---|---|---|---|
| | | | | | Print | Copy | Scan-to-file | E-mail | FAX |
| a | A developing department (employee) | abcdef | ABCDFE | aaa@abc.com | Authorized (no upper limit) | Authorized (no upper limit) | Authorized (no upper limit) | Authorized (no upper limit) | Authorized (no upper limit) |
| b | A developing department (employee) | bbbbbb | BCBCBC | bbb@abc.com | Authorized (no upper limit) | Authorized (no upper limit) | Authorized (no upper limit) | Authorized (10 sheets or less) | Authorized (20 sheets or less) |
| d | A developing department (employee) | cdcdcd | AAAAAA | ccc@abc.com | Authorized (20 sheets or less) | Authorized (20 sheets or less) | Unauthorized (0 sheet) | Unauthorized (0 sheet) | Unauthorized (0 sheet) |
| d | B developing department (Temporary employee) | dddddd | BCDEFG | ddd@abc.com | Authorized (no upper limit) | Authorized (no upper limit) | Authorized (no upper limit) | Authorized (no upper limit) | Authorized (10 sheets or less) |
| ... | ... | ... | ... | ... | ... | ... | ... | ... | ... |

FIG. 2

◎Print

| Target | First authentication result | Functional restrictions added to the first authentication result |
|---|---|---|
| Employee | Authorized (no limit) | Authorized (100 sheets of less) |
| | Authorized (50 sheets of less) | Authorized (30 sheets of less) |
| | Authorized (10 sheets of less) | Authorized (5 sheets of less) |
| Temporary employee | Authorized (no limit) | Authorized (100 sheets of less) |
| | Authorized (50 sheets of less) | Authorized (30 sheets of less) |
| | Authorized (10 sheets of less) | Authorized (5 sheets of less) |

◎Copy

| Target | First authentication result | Functional restrictions added to the first authentication result |
|---|---|---|
| Employee | Authorized (no limit) | Authorized (50 sheets of less) |
| | Authorized (50 sheets of less) | Authorized (10 sheets of less) |
| | Authorized (10 sheets of less) | Authorized (5 sheets of less) |
| Temporary employee | Authorized (no limit) | Authorized (10 sheets of less) |
| | Authorized (50 sheets of less) | Authorized (5 sheets of less) |
| | Authorized (10 sheets of less) | Unauthorized (0 sheet) |

◎Scan-to-file

| Target | First authentication result | Functional restrictions added to the first authentication result |
|---|---|---|
| Employee | Authorized (no limit) | Authorized (30 sheets of less) |
| | Authorized (50 sheets of less) | Authorized (10 sheets of less) |
| | Authorized (10 sheets of less) | Authorized (5 sheets of less) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

◎E-mail

| Target | First authentication result | Functional restrictions added to the first authentication result |
|---|---|---|
| Employee | Authorized (no limit) | Authorized (10 sheets of less) |
| | Authorized (50 sheets of less) | Authorized (5 sheets of less) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

◎FAX

| Target | First authentication result | Functional restrictions added to the first authentication result |
|---|---|---|
| Employee | Authorized (no limit) | Unauthorized (0 sheet) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

FIG. 3

| User name | Department | Password | Internal password | E-mail address | Functional restrictions | | | | |
|---|---|---|---|---|---|---|---|---|---|
| | | | | | Print | Copy | Scan-to-file | E-mail | FAX |
| a | A developing department (employee) | abcdef | ABCDFE | aaa@abc.com | Authorized (100 sheet of less) | Authorized (50 sheet of less) | Authorized (30 sheet of less) | Authorized (10 sheet of less) | Unauthorized (0 sheet) |
| b | A developing department (employee) | bbbbbb | BCBCBC | bbb@abc.com | Authorized (100 sheet of less) | Authorized (50 sheet of less) | Authorized (30 sheet of less) | Unauthorized (0 sheet) | Unauthorized (0 sheet) |
| c | A developing department (employee) | cdcdcd | AAAAAA | ccc@abc.com | Authorized (20 sheets or less) | Authorized (5 sheets or less) | Unauthorized (0 sheet) | Unauthorized (0 sheet) | Unauthorized (0 sheet) |
| d | B developing department (Temporary employee) | dddddd | BCDEFG | ddd@abc.com | Authorized (100 sheet of less) | Authorized (50 sheet of less) | Authorized (30 sheet of less) | Authorized (10 sheet of less) | Unauthorized (0 sheet) |
| · · · | · · · | · · · | · · · | · · · | · · · | · · · | · · · | · · · | · · · |

FIG. 4

| User name | Department | Password | Internal password | E-mail address | Functional restrictions ||||| 
|---|---|---|---|---|---|---|---|---|---|
| | | | | | Print | Copy | Scan-to-file | E-mail | FAX |
| a | A developing department (employee) | abcdef | ABCDFE | aaa@abc.com | Authorized (no upper limit) | No history | No history | No history | No history |
| b | A developing department (employee) | bbbbbb | BCBCBC | bbb@abc.com | Authorized (no upper limit) | Authorized (no upper limit) | Authorized (no upper limit) | Authorized (10 sheets or less) | Authorized (20 sheets or less) |
| c | A developing department (employee) | ddcdcd | AAAAAA | ccc@abc.com | Authorized (20 sheets or less) | Authorized (20 sheets or less) | No history | Unauthorized (0 sheet) | No history |
| d | B developing department (Temporary employee) | dddddd | BCDEFG | ddd@abc.com | Authorized (no upper limit) | No history | No history | Authorized (no upper limit) | Authorized (10 sheets or less) |
| ... | ... | ... | ... | ... | ... | ... | ... | ... | ... |

FIG. 5

◎Print

| Target | History | Functional restrictions to be used at the second authentication portion |
|---|---|---|
| Employee | Authorized (no limit) | Authorized (50 sheets of less) |
| | Authorized (50 sheets of less) | Authorized (20 sheets of less) |
| | Authorized (10 sheets of less) | Authorized (5 sheets of less) |
| Temporary employee | Authorized (no limit) | Authorized (10 sheets of less) |
| | Authorized (50 sheets of less) | Authorized (5 sheets of less) |
| | Authorized (10 sheets of less) | Authorized (5 sheets of less) |

◎Copy

| Target | History | Functional restrictions to be used at the second authentication portion |
|---|---|---|
| Employee | Authorized (no limit) | Authorized (30 sheets of less) |
| | Authorized (50 sheets of less) | Authorized (5 sheets of less) |
| | Authorized (10 sheets of less) | Unauthorized (0 sheets of less) |
| Temporary employee | Authorized (no limit) | Authorized (10 sheets of less) |
| | Authorized (50 sheets of less) | Authorized (5 sheets of less) |
| | Authorized (10 sheets of less) | Unauthorized (0 sheet) |

◎Scan-to-file

| Target | History | Functional restrictions to be used at the second authentication portion |
|---|---|---|
| Employee | Authorized (no limit) | Authorized (5 sheets of less) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

◎E-mail

| Target | History | Functional restrictions to be used at the second authentication portion |
|---|---|---|
| Employee | Authorized (no limit) | Authorized (5 sheets of less) |
| | Authorized (50 sheets of less) | Unauthorized (0 sheet) |
| | Authorized (5 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (5 sheets of less) | Unauthorized (0 sheet) |

◎FAX

| Target | History | Functional restrictions to be used at the second authentication portion |
|---|---|---|
| Employee | Authorized (no limit) | Unauthorized (0 sheet) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

FIG. 6

| User name | Department | Password | Internal password | E-mail address | Functional restrictions | | | | |
|---|---|---|---|---|---|---|---|---|---|
| | | | | | Print | Copy | Scan-to-file | E-mail | FAX |
| a | A developing department (employee) | abcdef | ABCDFE | aaa@abc.com | Authorized (50 sheets or less) | Unauthorized (0 sheet) | Unauthorized (0 sheet) | Unauthorized (0 sheet) | Unauthorized (0 sheet) |
| b | A developing department (employee) | bbbbbb | BCBCBC | bbb@abc.com | Authorized (50 sheets or less) | Authorized (30 sheets or less) | Authorized (5 sheets or less) | Unauthorized (0 sheet) | Unauthorized (0 sheet) |
| c | A developing department (employee) | cdcdcd | AAAAAA | ccc@abc.com | Authorized (5 sheets or less) | Authorized (5 sheets or less) | Unauthorized (0 sheet) | Unauthorized (0 sheet) | Unauthorized (0 sheet) |
| d | B developing department (Temporary employee) | dddddd | BCDEFG | ddd@abc.com | Authorized (50 sheets or less) | Unauthorized (0 sheet) | Unauthorized (0 sheet) | Unauthorized (0 sheet) | Unauthorized (0 sheet) |
| ... | ... | ... | ... | ... | ... | ... | ... | ... | ... |

FIG. 7

◎Print

| Target | History | Functional restrictions to be used after the 2nd authentication portion |
|---|---|---|
| Employee | Authorized (no limit) | Authorized (30 sheets of less) |
| | Authorized (50 sheets of less) | Authorized (5 sheets of less) |
| | Authorized (10 sheets of less) | Unauthorized (0 sheet) |
| Temporary employee | Authorized (no limit) | Authorized (5 sheets of less) |
| | Authorized (50 sheets of less) | Unauthorized (0 sheet) |
| | Authorized (10 sheets of less) | Unauthorized (0 sheet) |

◎Copy

| Target | History | Functional restrictions to be used after the 2nd authentication portion |
|---|---|---|
| Employee | Authorized (no limit) | Authorized (5 sheets of less) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

◎Scan-to-file

| Target | History | Functional restrictions to be used after the 2nd authentication portion |
|---|---|---|
| Employee | Authorized (no limit) | Unauthorized (0 sheet) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

◎E-mail

| Target | History | Functional restrictions to be used after the 2nd authentication portion |
|---|---|---|
| Employee | Authorized (no limit) | Unauthorized (0 sheet) |
| | Authorized (50 sheets of less) | Unauthorized (0 sheet) |
| | Authorized (5 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (5 sheets of less) | Unauthorized (0 sheet) |

◎FAX

| Target | History | Functional restrictions to be used after the 2nd authentication portion |
|---|---|---|
| Employee | Authorized (no limit) | Unauthorized (0 sheet) |
| | Authorized (50 sheets of less) | Unauthorized (0 sheet) |
| | Authorized (10 sheets of less) | Unauthorized (0 sheet) |
| Temporary employee | Authorized (no limit) | Unauthorized (0 sheet) |
| | Authorized (50 sheets of less) | Unauthorized (0 sheet) |
| | Authorized (10 sheets of less) | Unauthorized (0 sheet) |

FIG. 8

| User name | Department | Password | Internal password | E-mail address | Functional restrictions | | | | |
|---|---|---|---|---|---|---|---|---|---|
| | | | | | Print | Copy | Scan-to-file | E-mail | FAX |
| a | A developing department (employee) | abcdef | ABCDFE | aaa@abc.com | Authorized (30 sheets or less) | Unauthorized (0 sheet) | Unauthorized (0 sheet) | Unauthorized (0 sheet) | Unauthorized (0 sheet) |
| b | A developing department (employee) | bbbbbb | BCBCBC | bbb@abc.com | Authorized (30 sheets or less) | Authorized (5 sheets or less) | Unauthorized (0 sheet) | Unauthorized (0 sheet) | Unauthorized (0 sheet) |
| c | A developing department (employee) | ddcdcd | AAAAAA | ccc@abc.com | Unauthorized (0 sheet) | Unauthorized (0 sheet) | Unauthorized (0 sheet) | Unauthorized (0 sheet) | Unauthorized (0 sheet) |
| d | B developing department (Temporary employee) | dddddd | BCDEFG | ddd@abc.com | Authorized (30 sheets or less) | Unauthorized (0 sheet) | Unauthorized (0 sheet) | Unauthorized (0 sheet) | Unauthorized (0 sheet) |
| ... | ... | ... | ... | ... | ... | ... | ... | ... | ... |

FIG. 9

AUTHENTICATION SYSTEM FOR INSTRUCTION PROCESSING APPARATUS, IMAGE FORMING APPARATUS, AUTHENTICATION CONTROL METHOD, AND AUTHENTICATION CONTROL PROGRAM

This application claims priority under 35 U.S.C. §119 to Japanese Patent Application No. 2004-273891 filed on Sep. 21, 2004, the entire disclosure of which is incorporated herein by reference in its entireties.

BACKGROUND OF THE INVENTION

1. Field of the Invention

The present invention relates to an authentication system for instruction processing apparatuses equipped with authentication means for executing user authentication at the time of using instruction processing apparatuses such as image forming apparatuses. It also relates to an image forming apparatus, an authentication control method and an authentication control program for use in the authentication system.

2. Description of the Related Art

The following description sets forth the inventor's knowledge of related art and problems therein and should not be construed as an admission of knowledge in the prior art.

In recent instruction processing apparatuses, such as MFPs (Multi Function Peripherals), for use in companies or offices, it has become popular to provide authentication functions. This arises from the necessity of strengthening user administration so as to protect the securities of MFPs since a number of users input, output or store images in MFPs and also to prevent a harmful influence to external terminals due to user's invalid operations since MFPs are connected to external terminals via a network to exchange images.

A method for realizing such authentication function is known. In this method, authorized user information is registered in an apparatus main body in advance like a department administration and the user information is compared with user information inputted at the time of using the apparatus.

In this method, however, the authentication can be performed only at the apparatus. Under the circumstances, in recent years, it becomes common to connect an authentication server to these apparatuses via a network so that authentication can be performed at any image forming apparatus installed in offices. In this system, the authentication server authenticates when a user such as an employee uses a MFP and the like, and authorization for the use of the apparatus is issued to the user within authorized limits on a plurality of functions of the MFP when the authentication is established.

Conventionally, as disclosed in Japanese Unexamined Laid-open Patent Publication No. 2001-312380, another technique is known. According to the technique, for example, a print restriction server is connected to a printer which is an instruction processing apparatus via a network so that the print restriction server performs user authentication. As a result of the user authentication, if it is recognized that the user is a registered user, the server transfers the print job and the server address to the printer so that the printer allows the printing when the obtained server address coincides with a registered server address.

In the technique disclosed in the aforementioned publication, however, in cases where the user authentication cannot be performed due to an error, such as a network failure, occurred between the printer and the authentication server (print restriction server), there is a problem that the printer cannot be used even if the user is an authorized user.

Authentication via an authentication server enables detailed user restrictions against complicated high-performance instruction processing apparatuses such as MFPs. Therefore, as for a function of transmitting image data to an outside connected to a network, e.g., a function of transmitting image data after scanning an original document, it is possible to restrict the data amount and/or destination in detail every user. However, for a user who uses the apparatus to make a small amount of copies, although strict security protection and/or copy number administration are not necessary, the user is required to access the authentication server every time the user uses the apparatus, which makes the user to feel bothersome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an authentication system for an instruction processing apparatus, capable of performing user authentication by a secondary authentication means even in cases where the user authentication cannot be performed due to network failure or another reason and also capable of enhancing user-friendliness.

Among other potential advantages, some embodiments can provide an image forming apparatus for use in the aforementioned authentication system.

Among other potential advantages, some embodiments can provide an authentication control method capable of performing user authentication by a secondary authentication means even in cases where the user authentication cannot be performed due to network failure or another reason and also capable of enhancing user-friendliness.

Among other potential advantages, some embodiments can provide an authentication control program for making a computer execute the aforementioned authentication control program.

According to a first aspect of the preferred embodiment of the present invention, an authentication system for an instruction processing apparatus, includes:

first and second authentication portions each for performing user authentication at the time of using the instruction processing apparatus; and a controller which makes the first authentication portion execute the user authentication and switches the first authentication portion to the second authentication portion when the user authentication by the first authentication portion cannot be established.

According to a second aspect of the preferred embodiment of the present invention, an authentication system for an instruction processing apparatus, the authentication system, includes:

first and second authentication portions each for performing user authentication at the time of using the instruction processing apparatus; and a controller which adds restrictions to processing functions of the instruction processing apparatus based on which of the first authentication portion and the second authentication portion performed the use authentication.

According to a third aspect of the preferred embodiment of the present invention, an image forming apparatus includes a controller which makes a first authentication portion execute user authentication at the time of using the image forming apparatus and switches from the first authentication portion to a second authentication portion when the user authentication cannot be established.

According to a fourth aspect of the preferred embodiment of the present invention, an image forming apparatus includes a controller which adds restrictions to processing functions of the image forming apparatus based on which of the first authentication portion and the second authentication portion performed the user authentication at the time of using the image forming apparatus.

According to a fifth aspect of the preferred embodiment of the present invention, an image forming apparatus includes a controller for selecting whether user authentication at the time of using the image forming apparatus is to be performed by a first authentication portion mounted in an apparatus main body or the user authentication is to be performed by an external second authentication portion connected to the apparatus main body via a network.

According to a sixth aspect of the preferred embodiment of the present invention, an authentication control method includes the steps of:

making a first authentication portion execute authentication at the time of use of an instruction processing apparatus by a user; and making a second authentication portion execute the authentication by switching from the first authentication portion to the second authentication portion when the authentication cannot be established by the first authentication portion.

According to a seventh aspect of the preferred embodiment of the present invention, an authentication control method includes the steps of:

discriminating which of a first authentication portion and a second authentication portion performed authentication at the time of use of an instruction processing apparatus by a user; and adding restrictions to processing functions of the instruction processing apparatus based on the discrimination result.

According to an eighth aspect of the preferred embodiment of the present invention, an authentication control method includes a step of selecting whether user authentication at the time of using the image forming apparatus is to be performed by a first authentication portion mounted in an apparatus main body or the user authentication is to be performed by an external second authentication portion connected to the apparatus main body via a network.

According to a ninth aspect of the preferred embodiment of the present invention, an authentication control program makes a computer execute the steps including:

making a first authentication portion execute authentication at the time of use of an instruction processing apparatus by a user; and making a second authentication portion execute the authentication when the authentication cannot be established by the first authentication portion.

According to a tenth aspect of the preferred embodiment of the present invention, an authentication control program makes a computer execute the steps including:

discriminating which of the first authentication portion and the second authentication portion performed authentication at the time of use of an instruction processing apparatus by a user; and adding restrictions to processing functions of the instruction processing apparatus based on the discrimination result.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 2 is a table showing authorized limits of each user in a first authentication apparatus;

FIG. 3 is a conversion table for adding functional restrictions when an authentication result cannot be recorded after authentication by a first authentication apparatus;

FIG. 4 is a table showing authorized limits of each user to be set using the conversion table shown in FIG. 3;

FIG. 5 is a table showing history of authentication results recorded in a recording portion;

FIG. 6 is a conversion table for adding functional restrictions based on the history shown in FIG. 5 when an authentication result cannot be recorded after authentication by a second authentication portion;

FIG. 7 is a table showing authorized limits of each user set using the conversion table shown in FIG. 6;

FIG. 8 is a conversion table for adding functional restrictions based on the history shown in FIG. 5 when it was impossible to record an authentication result cannot be recorded by the second authentication portion;

FIG. 9 is a table showing authorized limits of each user set using the conversion table shown in FIG. 8;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
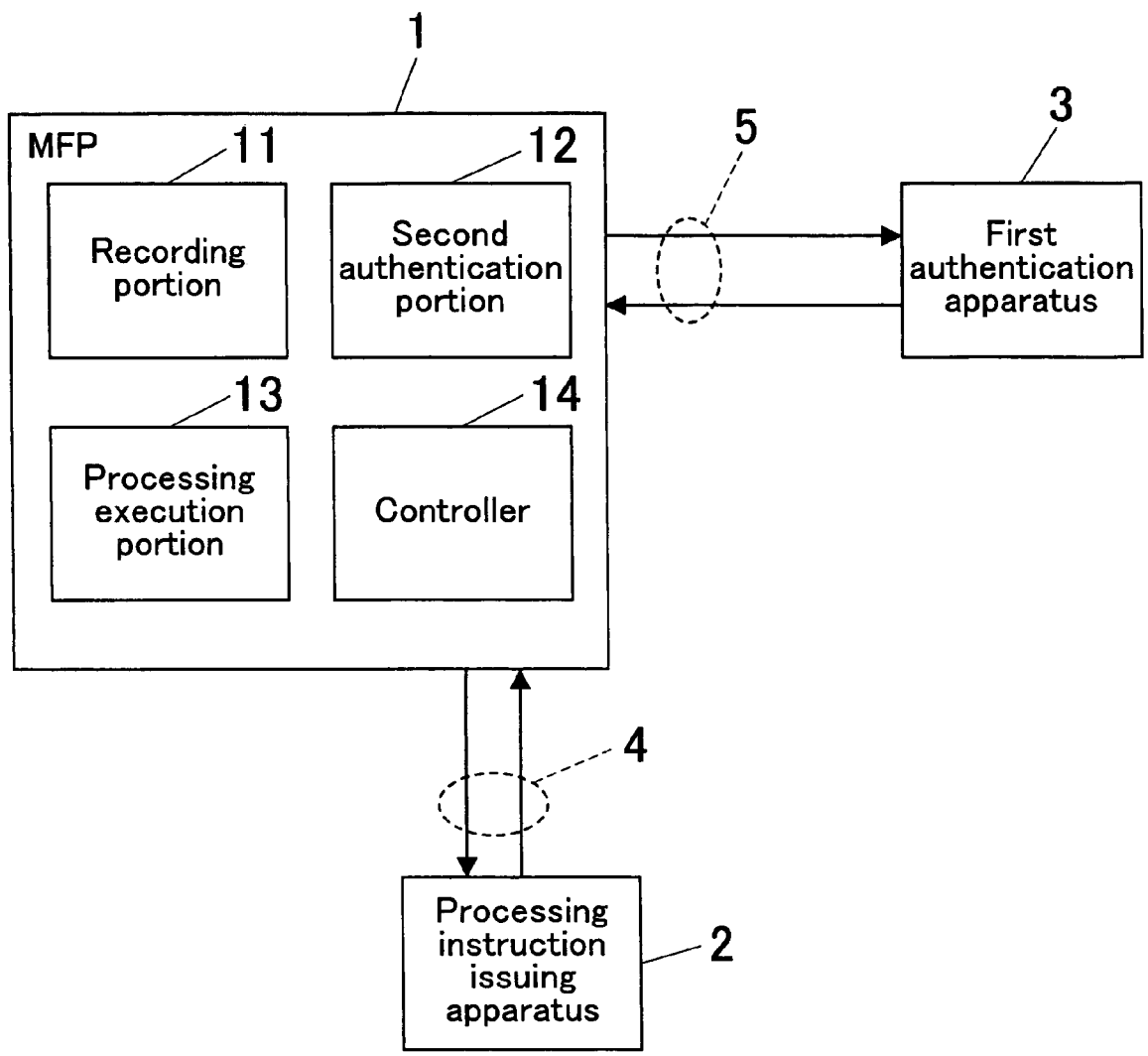
FIG. 1 is a block diagram showing an image forming system to which an authentication system for an image forming apparatus according to an embodiment of the present invention is applied.

FIG. 1 is a block diagram showing an image forming system to which an authentication system according to an embodiment of the present invention is applied.

As shown in FIG. 1, the image forming system is provided with a MFP 1 which is an image forming apparatus as an instruction processing apparatus, a processing instruction issuing apparatus 2, and a first authentication apparatus 3.

The MFP 1 is provided with a recording portion 11, a second authentication portion 12, a processing execution portion 13, and a controller 14.

The recording portion 11 is used to record authentication results as a history every user, and is comprised of a readable memory. In this recording portion 11, a conversion table to be used at the time of adding any restriction to the processing functions of the MFP 1 based on authentication results is also recorded. The conversion table will be detailed later.

The aforementioned second authentication portion 12 performs user authentication based on an instruction issued from a controller 14 in the case in which the authentication by the first authentication apparatus 3 could not be established.

The processing execution portion 13 has a function of executing a user's processing instruction issued from the processing instruction issuing apparatus 2 based on an instruction of the controller 14. In this embodiment, the processing execution portion 13 can execute various processing including, for example, print processing, copy processing, scan-transmission processing (processing of transmitting image data of an original document read with a reader (not shown) via an email or the like), scan-to-file processing (processing of storing image data of an original document read with a reader (not shown) in a box or the like), facsimile (FAX) transmission processing, received document transferring processing, received document print processing, personal box document operation processing, and personal set information change processing.

The controller 14 includes a CPU, a ROM and a RAM, and generally controls the entire MFP 1. For example, the controller 14 transmits an authentication processing activation instruction to the first authentication apparatus 3 together with necessary user information when a processing instruction is transmitted by a user from the processing instruction issuing apparatus 2. Furthermore, receiving a processing execution authorization judgment result (i.e., authentication result) from the first authentication apparatus 3, the controller 14 makes the recording portion 11 record the authentication result and also makes the processing execution portion 13 execute the processing. In this case, in the event that the authentication result of the first authentication apparatus 3 cannot be recorded in the recording portion 11 due to overflowed recording capacity of the recording portion 11 or another reason, the controller 14 makes the processing execution portion 13 execute the processing with processing functions further restricted as compared with the case in which an authentication result can be recorded.

Furthermore, in cases where the authentication by the first authentication apparatus 3 cannot be established due to a failure of the second network 5 or another reason, the controller 14 switches to the second authentication portion 12 to execute the authentication, and makes the recording portion 11 record the authentication result therein. In this case, the controller 14 makes the processing execution portion 13 execute with processing functions further restricted as compared with the case in which authentication was performed by the first authentication apparatus 3. However, in cases where the authentication result by the second authentication portion 12 cannot be recorded in the recording portion 11, the controller 14 makes the processing execution portion 13 execute with processing functions much further restricted. These functional restrictions will be detailed.

The processing instruction issuing apparatus 2 is a user terminal, such as a personal computer, to use the MFP 1, and is connected to the MFP 1 via a first network 4. As the first network 4, a LAN can be exemplified.

The aforementioned first authentication apparatus 3 is an authentication server connected to the MFP 1 via a second network 5, and judges whether processing execution can be authorized based on previously registered authorized limits of each user upon receipt of authentication processing activation instruction from the MFP 1. As the second network 5, an external LAN can be exemplified.

FIG. 2 shows an authorization table showing the authorized limits of each user registered in the first authentication apparatus 3. In this table, every user name, "Department name, and Discrimination between an employee and a temporary employee," "Password," "Internal password," "E-mail address" are written, and contents of restricted processing of each function are registered. For example, as for a user "a," no upper limit is set on each of print, copy, scan-to-file, E-mail and FAX functions. On the other hand, as for a user "c," 20-sheet upper limit is set on each of print and copy functions, but non-authorization is set on each of scan-to-file, E-mail and FAX functions.

In cases where authentication has been established by the first authentication apparatus 3 and the authentication result can be recorded in the recording portion 11 of the MFP 1, the use of the MFP 1 will be authorized within the authorized limits set in the Table shown in FIG. 2, and an instruction of a user will be processed by the processing execution portion 13.

In cases where the authentication result established by the first authentication apparatus 3 cannot be recorded due to an overflowed recording capacity of the recording portion 11 or another reason, the controller 14 issues an authorization to the user with further functional restrictions added to the authorized limits set in the authorization table shown in FIG. 2. Examples of such further functional restrictions include:

(1) prohibition of changing personal information;
(2) prohibition of operating personal box documents;
(3) decreased upper limit of authorized number of prints (limited usable time);
(4) limitation from color to monochrome;
(5) limitation to local usage only (i.e., prohibition of usages using a network, such as scan transmission, FAX transmission, transfer of received documents, print of received documents); and
(6) change of limitation contents depending on user types such as a discrimination between an employee and a temporary employee.

Conversion tables for deciding concrete authorized limits are shown in FIG. 3.

In the conversion tables shown in FIG. 3, every function, the contents of each table are classified depending on a discrimination between an employee and a temporary employee, and additional restrictions are added to the authorized limits authorized by the first authentication apparatus 3. For example, in cases where an employee user issues a printer processing instruction, the instruction is authorized by the first authentication apparatus 3 referring to the authorization table shown in FIG. 2 and then an authorized result that authorization is given with no limitation is transmitted, when the result cannot be recorded in the recording portion 11, authorization will be given with a limitation of 100 sheets or less by referring the item of "FUNCTION (shown as "double circle" in FIG. 3): Print; TARGET: Employee; FIRST AUTHENTICATION RESULT: Authorized (no limitation)." Furthermore, in cases where an employee user is authorized to print 50 sheets or less, 10 sheets or less by the first authentication apparatus 3, authorization will be given with a limitation of 30 sheets or less or 5 sheets or less respectively. As for a temporary employee or other functions other than the print function, additional restrictions are added in the same manner as mentioned above.

The authorized limits of each user after the conversion using the conversion table shown in FIG. 3 can be summarized as shown in FIG. 4. It is understood that functional restrictions are added and therefore the authorized limits became narrower as compared with the authorized limits shown in FIG. 2.

As explained above, by restricting the authorized limits in cases where the authentication result by the first authentication apparatus 3 cannot be recorded in the recording portion 11, it becomes possible to secure the usability of the MFP 1 while preventing deterioration of the security due to the record failure of the authentication result, which in turn enhances the convenience for a user.

Next, functional restrictions to be added when the authentication by the first authentication apparatus 3 cannot be established due to a certain reason such as a failure of the second network 5 will be explained. In this case, as mentioned above, the user authentication will be executed by the second authentication portion 12 in place of the first authentication portion 3, and the authentication result will be recorded in the recording portion 11.

The user authentication by the second authentication portion 12 is executed based on a past user authentication result recorded in the recording portion 11.

FIG. 5 shows a history table recorded in the recording portion 11. For example, in the case of a user "a," as for a print function "authorized (no upper limit)" is recorded, and as for the other functions "no history" is recorded. Furthermore, in the case of a user "b," as for each function of print, copy and scan-to-file "authorized (no upper limit)" is recorded. As for E-mail "authorized (10 sheets or less)" is recorded, and as for FAX "authorized (20 sheets or less)" is recorded. Such history can be overwritten every time a user authentication is executed. Alternatively, the data of the history can be used at the time of authentication by accumulating and analyzing it.

In the case of the user authentication by the second authentication portion 12, user usage authorization is issued by further adding functional restrictions to the authentication result shown in the history table shown in FIG. 5. An example of a conversion table for deciding the authorized limits at this time is shown in FIG. 6.

In the conversion table shown in FIG. 6, every function, the contents of each table is classified depending on a discrimination between an employee and a temporary employee, and additional restrictions are added depending on the history shown in FIG. 5. For example, in cases where the history of the print processing by an employee user is "authorized (not limit)," an authorization with a limit of 50 sheets or less is issued by referring the Item of "FUNCTION: print; TARGET: employee; HISTORY: authorized (no limit)" in the conversion table shown in FIG. 6. Furthermore, in cases where an employee user was authorized to print with a limit of 50 sheets or less and 10 sheets or less in the history, the employee user will be authorized to print with a limit of 20 sheets or less and 5 sheets or less respectively. As for a temporary employee or other functions other than the print function, additional restrictions are added in the same manner as mentioned above.

The authorized limits of each user after the conversion using the conversion table shown in FIG. 6 can be summarized as shown in FIG. 7. It is understood that functional restrictions are added and therefore the authorized limits became narrower as compared with the authorized limits shown in FIG. 4.

In cases where the authentication result cannot be recorded after the authentication by the second authentication portion 12 due to a certain reason such as an overflowed recording capacity of the recording portion 11, the controller 14 will issue authorization to the user with further functional limitations added to the authorized limits set in the authorization table shown in FIG. 6 based on the authentication result shown in the history table shown in FIG. 5.

In an example shown in the conversion table in FIG. 8, in cases where the printer processing history of an employee user shows "authorized (not limit)," authorization with a limit of "30 sheets or less" is issued to the employee user with reference to the Item of "FUNCTION: Print, TARGET: Employee, HISTORY: Authorized (no limit)" in the conversion table. On the other hand, in cases where the printer processing history of the employee user shows "50 sheets or less" and "10 sheets or less," authorization with a limit of "5 sheets or less" and "Unauthorized (0 sheet)" is issued to the employee user respectively. As for a temporary employee and other functions other than the print function, additional restrictions are added in the same manner as mentioned above.

The authorized limits of each user after the conversion using the conversion table shown in FIG. 8 can be summarized as shown in FIG. 9. It is understood that functional restrictions are added and therefore the authorized limits became narrower as compared with the authorized limits shown in FIG. 7.

Figure 10:
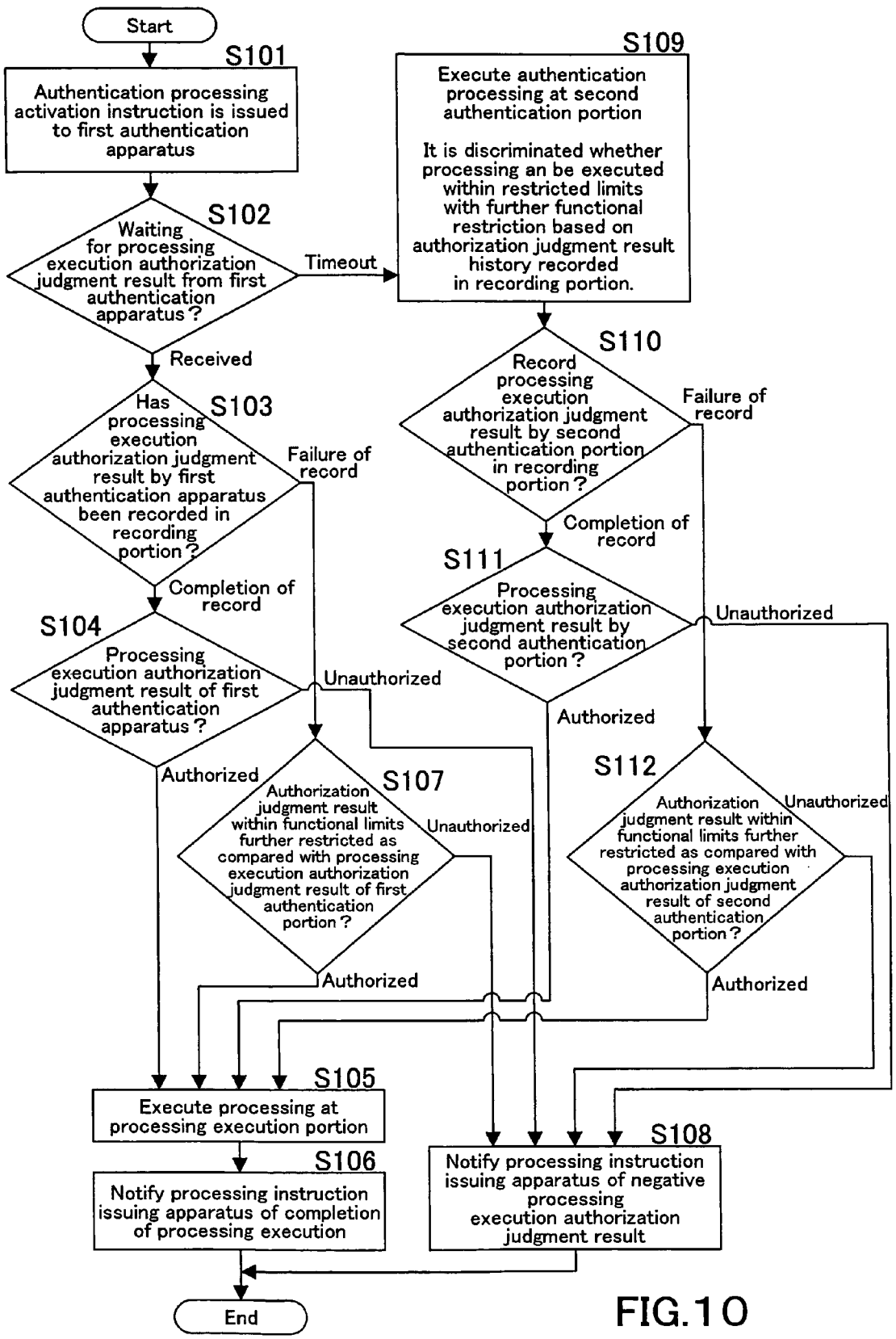
FIG. 10 is a flowchart showing a process flow of a MFP.

Now, the operation of the MFP 1 in the image forming system shown in FIG. 1 will be explained with reference to the flowchart shown in FIG. 10 showing the contents of the processing executed by the controller 14. The processing is performed by a CPU in the controller 14 by executing the program stored in a ROM or another such non-transitory computer readable storage medium. In the following explanation and drawings, Step will be abbreviated as "S."

In FIG. 10, at S101, receiving a processing instruction from the processing instruction issuing apparatus 2, the controller 14 of the MFP 1 issues an authentication processing activation instruction to the first authentication apparatus 3 to confirm whether the user is authorized to execute the processing.

At S102, the controller 14 waits for a processing execution authorization judgment result (authentication result) from the first authentication apparatus 3. If the processing execution authorization judgment result is received ("Received" at S102), the routine proceeds to S103. When the waiting time for receiving the processing execution authorization judgment result is up ("timeout" at S102), the routine proceeds to S109.

At S103, the controller 14 discriminates whether the processing execution authorization judgment result by the first authentication apparatus 3 has been recorded in the recording portion 11. If the processing execution authorization judgment result has been recorded in the recording portion 11 ("Completion of record" at S103), the routine proceeds to S104. However, if the processing execution authorization judgment result cannot be recorded in the recording portion 11 ("Failure of record" at S103), the routine proceeds to S107.

At S104, it is discriminated whether the processing execution authorization judgment result from the first authentication apparatus 3 is affirmative, i.e., "authorized." If the processing execution authorization judgment result from the first authentication apparatus 3 is affirmative, i.e., "authorized" ("authorized" at S104), at S105, the controller 14 makes the processing execution portion 13 execute the processing instructed by the user. In this case, the processing is executed within the authorized limits shown in FIG. 2. After the completion of the processing, at S106, the controller 14 notifies the processing instruction issuing apparatus 2 of the processing execution completion, and the routine terminates.

If the processing execution authorization judgment result from the first authentication apparatus 3 is negative, i.e., "unauthorized" ("unauthorized" at S104) at S104, at S108, the controller 14 notifies the processing instruction issuing apparatus 2 of the negative result of the processing execution authorization judgment, and the routine terminates.

At S107, since the processing execution authorization judgment result cannot be recorded in the recording portion 11, it is discriminated whether it is possible to authorize within the authorized limits shown in FIG. 4 in which further functional restrictions are added to the authorized limits of the first authentication apparatus 3. If it is discriminated that it is possible to authorize within the authorized limits with further functional restrictions added ("authorized" at S107), the routine proceeds to S105. After the completion of the processing by the processing execution portion 13, at S106, completion of the processing execution is notified to the processing instruction issuing apparatus 2 and the routine terminates. If the processing execution cannot be authorized within the functional restrictions ("unauthorized" at S107), the routine proceeds to S108. After the notification of the negative result of the processing execution authorization judgment to the processing instruction issuing apparatus 2, the routine terminates.

At S109, since the authentication at the first authentication apparatus 3 has not been established, the controller 14 of the MFP 1 makes the second authentication apparatus 12 execute the authentication processing. In this authentication processing by the second authentication portion 12, further functional restrictions are added with reference to the conversion table shown in FIG. 6 based on the record of the authentication result (processing execution authorization judgment result) shown in FIG. 5 and recorded in the recording portion 11, and it is discriminated whether the processing execution can be authorized within the authorized limits shown in FIG. 7.

At S110, it is discriminated whether the processing execution authorization judgment result by the second authentication portion 12 has been recorded in the recording portion 11. If the recording of the processing execution authorization judgment result by the second authentication portion 12 in the recording portion 11 has been completed ("completion of record" at S110), the routine proceeds to S111. To the contrary, if the recording of the processing execution authorization judgment result in the recording portion 11 has been failed ("failure of record" at S110), the routine proceeds to S112.

At S111, the controller 14 discriminates the processing execution authorization judgment result from the second authentication portion 12 (whether authorized or not). If the processing execution authorization judgment result is affirmative, i.e., "authorized" ("authorized" at S111), the routine proceeds to S105. After making the processing execution portion 13 execute the processing, at S106, the notification of completion of the processing is notified to the processing instruction issuing apparatus 2, the routine terminates. To the contrary, if the processing execution authorization judgment result is negative, i.e., "unauthorized" ("unauthorized" at S111), the routine proceeds to S108. After the notification of negative result of the processing execution judgment to the processing instruction issuing apparatus 2, the routine terminates.

At S112, since the second processing execution authorization judgment result cannot be recorded in the recording portion 11, it is discriminated whether it is possible to authorize within the authorized limits shown in FIG. 9 in which further functional restrictions are added to the authorized limits shown in FIG. 7 of the second authentication apparatus 12. If it is discriminated that it is possible to authorize within the authorized limits ("authorized" at S112), the routine proceeds to S105. After the completion of the processing by the processing execution portion 13, at S106, completion of the processing is notified to the processing instruction issuing apparatus 2, and the routine terminates. If the processing cannot be authorized ("unauthorized" at S112), the routine proceeds to S108. After the notification of the negative result of the processing execution authorization judgment to the processing instruction issuing apparatus 2, the routine terminates.

Next, the authentication processing flow at the first authentication apparatus 3 will be explained with reference to the flowchart shown in FIG. 11. The authentication processing is activated by receiving a user name, a password, a department name, an internal password, an E-mail address, processing contents, etc., from the MFP 1.

Figure 11:
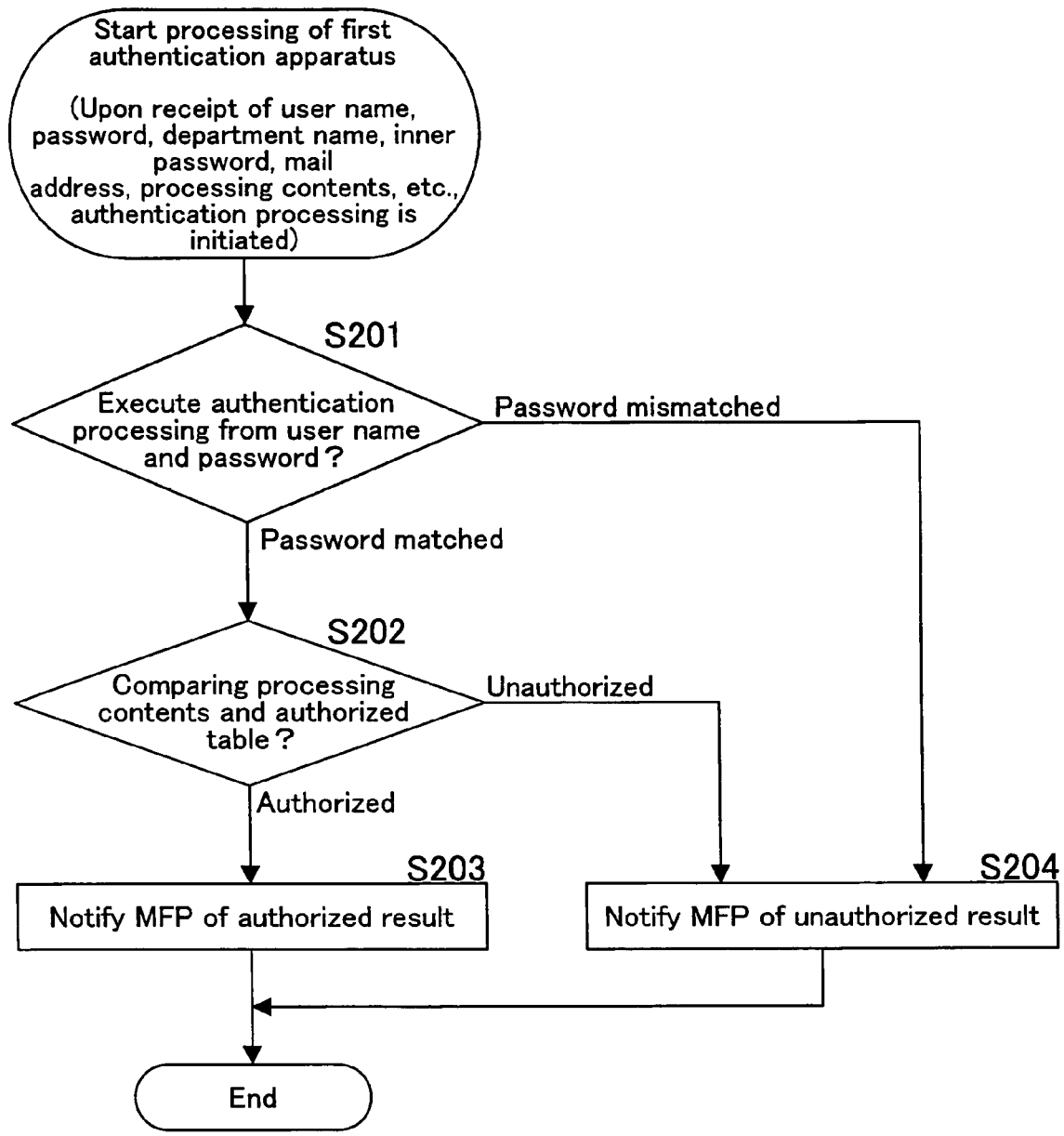
FIG. 11 is a flowchart showing a process flow in the first authentication apparatus.

In FIG. 11, at S201, it is discriminated whether it is possible to execute the authentication processing depending on whether the inputted user name and password coincide with the user name and password stored. If the user name and password match and therefore it is discriminated that it is possible to execute the authentication processing ("matched password" in S201), the routine proceeds to S202. To the contrary, if the use name and password does not match ("mismatched password" in S201) and therefore it is impossible to execute the authentication processing, the routine proceeds to S204.

At S202, it is discriminated whether the contents of the processing instruction by the user are within the authorized limits of the authorization table shown in FIG. 2. If the processing contents fall within the authorized limits shown in the authorization table ("authorized" at S202), at S203, a notice of the authorization is given to the MFP 1, and the routine terminates. However, if the processing contents do not fall within the authorized limits shown in the authorization table ("unauthorized" at S202), the routine proceeds to S204 and a notice of the negative judgment of the authorization is given to the MFP 1. Then, the routine terminates.

Next, the flow of the authentication processing at the second authentication portion 12 will be explained with reference to the flowchart shown in FIG. 12.

Figure 12:
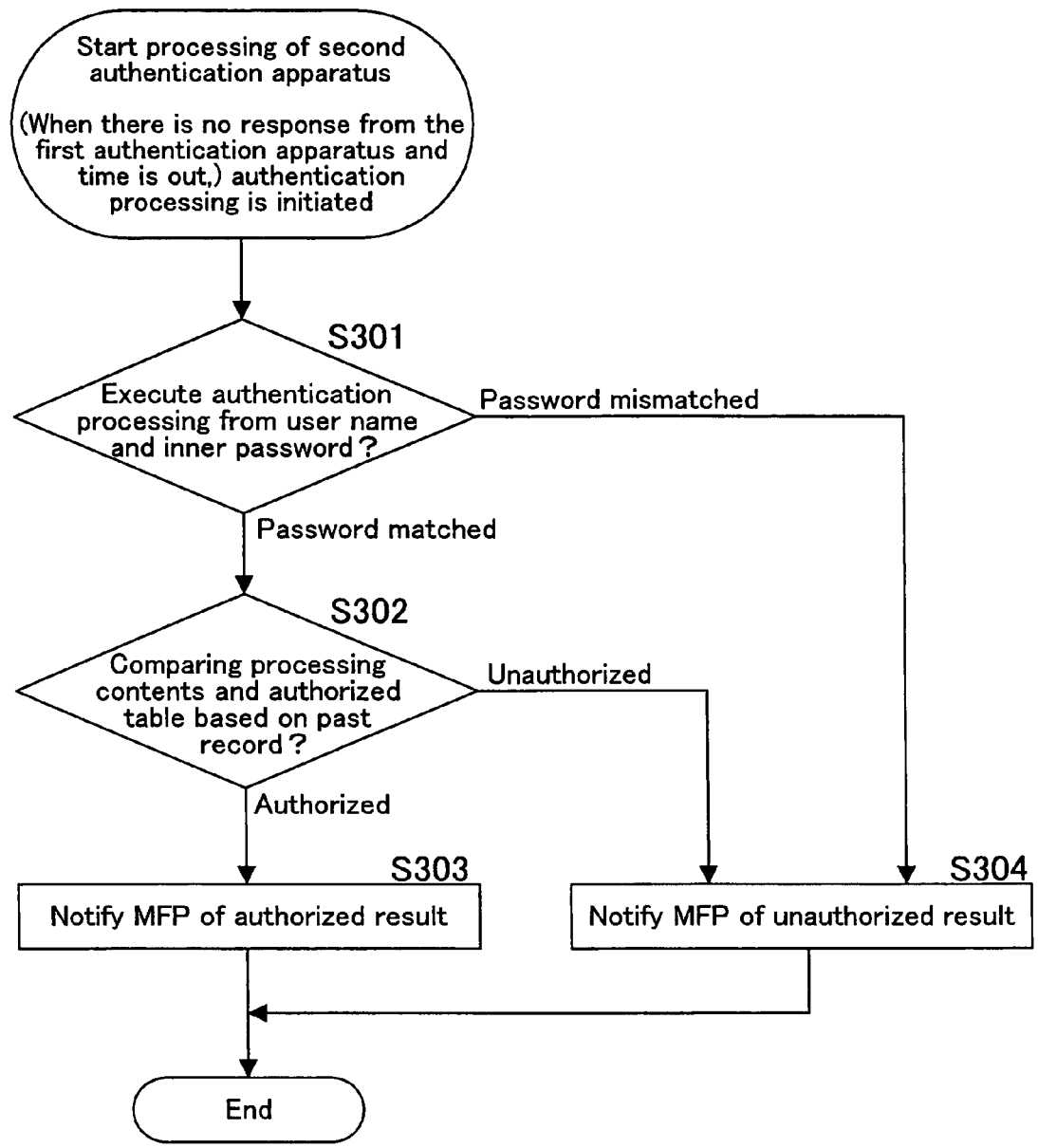
FIG. 12 is a flowchart showing a process flow in the second authentication apparatus.

In FIG. 12, at S301, it is discriminated whether it is possible to execute the authentication processing depending on whether the inputted user name and password coincide with the user name and password stored. If the user name and password match and therefore it is discriminated that it is possible to execute the authentication processing ("matched password" in S301), the routine proceeds to S302. To the contrary, if the use name and password does not match ("mismatched password" in S301) and therefore it is impossible to execute the authentication processing, the routine proceeds to S304.

At S302, it is discriminated whether the contents of the processing are within the authorized limits shown in FIG. 7 based on the record recorded in the recording portion 11. If the processing contents fall within the authorized limits ("authorized" at S302), at S303, a notice of the authorization is given to the controller 14, and the routine terminates. However, if the processing contents do not fall within the authorized limits ("unauthorized" at S302), the routine proceeds to S304 and a notice of the negative judgment of the authorization is given to the controller 14. Then, the routine terminates.

As explained above, in this embodiment, by classifying the situation into: (a) the case in which it is authorized at the first authentication apparatus 3 and the authentication result can be recorded in the recording portion 11; (b) the case in which it is authorized at the first authentication apparatus 3 but the authentication result cannot be recorded in the recording portion 11; (c) the case in which it is authorized at the second authentication portion 12 and the authentication result can be recorded in the recording portion 11; and (d) the case in which it is authorized in the second authentication apparatus 3 but the authentication result cannot be recorded in the recording portion 11, functional restrictions are tightened stepwise to narrow the authorized limits. This is a result of a consideration of a balance between assurance of security and usage of a user since the security level deteriorates stepwise every case mentioned above. By admitting the use of a user while keeping the security, the convenience of a user is secured while avoiding an occurrence of unusable situations of the MFP 1.

Although an embodiment of the present invention is explained, the present invention is not limited to the above. For example, in the aforementioned embodiment, although authentication at the second authentication portion 12 is required when authentication cannot be established at the first authentication portion 3, it can be configured such that the first authentication portion and the second authentication portion can be selectively used.

In this case, for example, in the case of user authentication for performing the processing by the MFP 1 under an external LAN environment, functional restrictions can be more tightened as compared with the user authentication for performing the processing by the MFP 1 under an internal LAN environment. Alternatively, authentication at the first authentication portion can be performed under an encryption environment and authentication at the second authentication portion can be performed under a non-encryption environment, and functional restrictions can be tightened in cases where authentication is performed under an encryption environment.

Furthermore, in the above embodiment, although the processing instruction is made by a user from the processing instruction issuing apparatus 2 via the network 4, it can be performed at an operation panel or the like of the MFP 1 (instruction processing apparatus).

Both the aforementioned first authentication portion 3 and the second authentication portion 12 can be provided outside the MFP (instruction processing apparatus) 1 or inside thereof.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An authentication system for an instruction processing apparatus, the authentication system, comprising:
    first and second authentication portions each for performing user authentication at the time of using the instruction processing apparatus;
    a recording portion that records an authentication result; and
    a controller which makes the first authentication portion execute the user authentication based on user information and switches from the first authentication portion to the second authentication portion when the user authentication by the first authentication portion cannot be established, and which adds restrictions to processing functions of the instruction processing apparatus based on a determination of whether or not an authentication result by the first or second authentication portion can be recorded in the recording portion, wherein the added restrictions result in a fewer amount of processing functions being available to a user when the authentication result by the first or second authentication portion is not able to be recorded in the recording portion than when the authentication result can be recorded in the recording portion, and wherein the second authentication portion executes the user authentication based on the user information.

2. The authentication system as recited in claim 1, wherein the instruction processing apparatus is an image forming apparatus.

3. An image forming apparatus, comprising a recording portion that records an authentication result; and a controller which makes a first authentication portion execute user authentication at the time of using the image forming apparatus based on user information and switches from the first authentication portion to a second authentication portion when the user authentication cannot be established, and which adds restrictions to processing functions of the instruction forming apparatus based on a determination of whether or not an authentication result by the first or second authentication portion can be recorded in the recording portion, wherein the added restrictions result in a fewer amount of processing functions being available to a user when the authentication result by the first or second authentication portion is not able to be recorded in the recording portion than when the authentication result can be recorded in the recording portion, and wherein the second authentication portion executes the user authentication based on the user information.

4. The image forming apparatus as recited in claim 3, wherein at least either the first authentication portion or the second authentication portion is provided.

5. An authentication control method, comprising the steps of:
   making a first authentication portion execute authentication based on user information at the time of use of an instruction processing apparatus by a user;
   making a recording portion record an authentication result;
   making a second authentication portion execute authentication based on the user information by switching from the first authentication portion to the second authentication when the authentication cannot be established by the first authentication portion; and
   adding restrictions to processing functions of the instruction processing apparatus based on a determination of whether or not an authentication result by the first or second authentication portion can be recorded in the recording portion wherein the added restrictions result in a fewer amount of processing functions being available to a user when the authentication result by the first or second authentication portion is not able to be recorded in the recording portion than when the authentication result can be recorded in the recording portion.

6. A non-transitory computer readable storage medium storing an authentication control program for making a computer execute the following steps, the steps comprising:
   making a first authentication portion execute authentication based on user information at the time of use of an instruction processing apparatus by a user;
   making a recording portion record an authentication result;
   making a second authentication portion execute the authentication based on the user information when the authentication cannot be established by the first authentication portion
   adding restrictions to processing functions of the instruction processing apparatus based on a determination of whether or not an authentication result by the first or second authentication portion can be recorded in the recording portion wherein the added restrictions result in a fewer amount of processing functions being available to a user when the authentication result by the first or second authentication portion is not able to be recorded in the recording portion than when the authentication result can be recorded in the recording portion.

7. The authentication system as recited in claim 1, wherein the controller utilizes a conversion table to determine whether or not to authorize a user within limited processing functions of the instruction processing apparatus.

8. The image forming apparatus as recited in claim 3, wherein the controller utilizes a conversion table to determine whether or not to authorize a user within limited processing functions of the image forming apparatus.

9. The authentication control method as recited in claim 5, further comprising the step of utilizing a conversion table to determine whether or not to authorize a user within limited processing functions of the instruction processing apparatus.

10. The non-transitory computer readable storage medium as recited in claim 6, wherein the authentication control program makes the computer execute the further step of utilizing a conversion table to determine whether or not to authorize a user within limited processing functions of the instruction processing apparatus.

* * * * *